United States Patent [19]
Varlamov et al.

[11] 4,192,931
[45] Mar. 11, 1980

[54] PROCESS FOR PRODUCING FURAN-EPOXY POWDER-LIKE BINDER

[76] Inventors: Gennady D. Varlamov, ulitsa Jubileinaya, 5 kv. 13; Juldash Mamatov, ulitsa Pushkina 50, kv. 60; Ildgam A. Bekbulatov, Kashkarskaya ulitsa 215; Shavkat Madaliev, ulitsa Yarmazar 361, all of Fergana, U.S.S.R.

[21] Appl. No.: 931,313

[22] Filed: Aug. 7, 1978

[51] Int. Cl.$^2$ ............................................. C08L 63/00
[52] U.S. Cl. ........................................ 525/489; 528/91; 525/481; 525/485; 525/488; 525/522
[58] Field of Search .................. 260/828, 831; 528/91

[56] References Cited

U.S. PATENT DOCUMENTS

| | | | |
|---|---|---|---|
| 2,629,703 | 2/1953 | Vogelsang | 260/828 |
| 2,839,481 | 6/1958 | Harvey | 260/828 |
| 2,839,487 | 6/1958 | Rosamilia | 260/828 |
| 2,839,488 | 6/1958 | Harvey | 260/828 |
| 2,853,469 | 9/1958 | Rosamilia | 260/828 |
| 2,853,470 | 9/1958 | Rosamilia | 260/828 |

FOREIGN PATENT DOCUMENTS

| | | | |
|---|---|---|---|
| 1141446 | 12/1962 | Fed. Rep. of Germany | 260/828 |
| 133965 | 12/1960 | U.S.S.R. | 260/828 |
| 467923 | 5/1975 | U.S.S.R. | 260/828 |

*Primary Examiner*—Paul Lieberman

*Attorney, Agent, or Firm*—Burgess, Ryan and Wayne

[57] ABSTRACT

A process for producing a furan-epoxy powder-like binder comprising reaction of an epoxy diane resin (100 parts by weight) with a ketone of the furan series (40 to 500 parts by weight) and a modifying agent (60 to 500 parts by weight). As the ketone of the furan series use is made of monofurfurylideneacetone, difurfurylideneacetone, difurfurylidenecyclohexanone, a mixture of monofurfurylidenacetone with difurfurylidenacetone, 1,9-di-(α-furyl)-nonanetetraene-1,3,6,8-one-5, or 1,5-di-(α-furyl)-2,4-dimethylpentadiene-1,4-one-3. As the modifying agent use is made of a phenolformaldehyde resin or anhydrides of dibasic carboxylic acids. The reaction is carried out at a temperature within the range of from 130° to 180° C. in the presence, when required, of trifurylborate (10 to 30 parts by weight). The resulting product is cooled to a temperature of at most 30° C. and disintegrated to a powder-like condition. The furan-epoxy binder according to the present invention is not clogging for 60 days; it is also capable of being stored for long periods, up to 12 months, without losing its initial properties. Strain heat-resistance of polymeric materials based on this binder is as high as 320° C. according to Vicat. Polymeric materials based on the binder of this invention can be both inflammable and non-inflammable or can have self-extinguishing properties.

2 Claims, No Drawings

PROCESS FOR PRODUCING FURAN-EPOXY POWDER-LIKE BINDER

FIELD OF THE INVENTION

The present invention relates to the art of production of furan-epoxy powder-like binders adapted to be used in the manufacture of spray coatings, laminates, moulding compositions, adhesives, foamed plastics.

BACKGROUND OF THE INVENTION

Known in the art is a process for producing a furanepoxy binder by reacting an epoxy diane resin (a product of polycondensation of epichlorohydrin with diphenylolpropane) with difurfurylideneacetone and a modifying agent, viz. furfuramide, at the temperature of 140° C. at the following proportions of the epoxy diane resin, difurfurylideneacetone and furfuramide, parts by weight:
  epoxy diane resin:100
  difurfurylideneacetone:50–150
  furfuramide:95–100;

The resultant product is cooled to a temperature of at most 30° C. and disintegrated to a powder-like condition.

The binder produced by this prior art process has an increased clogging (becomes clogged after 30 days) and cannot be stored for long periods (more than 3 months) without loss of its initial properties (solubility and meltability). Vicat heat-resistance of polymeric materials prepared from said furan-epoxy polymeric powder-like binder does not exceed 208° C. Moreover, polymeric materials prepared on the basis of said binder are inflammable. These disadvantages restrict the field of application of the furan-epoxy polymeric binder.

SUMMARY OF THE INVENTION

It is an object of the present invention to provide such a process which would make it possible to prepare a furan-epoxy powder-like binder which would feature an increased non-clogging ability.

It is another object of the present invention to provide such a process which would make it possible to prepare a furan-epoxy powder-like binder which would be capable of being stored for long periods without alteration of its initial properties.

It is a further object of the present invention to increase the strain heat-resistance of polymeric materials based on a furan-epoxy powder-like binder.

Still another object of the present invention is to impart, to polymeric materials on the basis of a furan-epoxy powder-like binder, the property of inflammability of selfextinction.

These and other objects of the present invention are accomplished by a process for producing a furan-epoxy powder-like binder by way of reacting an epoxy diane resin with a ketone of the furan series and a modifying agent upon heating, followed by cooling the resulting product to a temperature of at most 30° C. and disintergration to a powder-like condition, wherein, in accordance with the present invention, as the ketone of the furan series use is made of monofurfurylideneacetone, difurfurylideneacetone, difurfurylidenecyclohexanone, a mixture of monofurfurylideneacetone and difurfurylideneacetone at a weight ratio therebetween of from 1:1 to 1.4:1 (parts by weight); 1,9-di-($\alpha$-furyl)-nonantetraene-1,3,6,8-one-5 or 1,5-di-($\alpha$-furyl)-2,4-dimethylpentadiene-1,4-one-3; as the modifying agent use is made of a phenol-formaldehyde resin or anhydrides of dibasic carboxylic acids; the interaction is effected at a temperature within the range of from 130° to 180° C. and at the following proportions of the above-mentioned components, parts by weight:
  epoxy diane resin:100
  ketone of the furan series:40 to 50
  phenol-formaldehyde resin or anhydrides of dibasic carboxylic acids:60 to 500.

The process according to the present invention makes it possible to produce a furan-epoxy powder-like resin which is not clogged for 60 days and capable of being stored for as long as 12 months without changing its initial properties. Strain heat-resistance of polymeric materials prepared on the basis of said binder is as high as 320° C. (according to Vicat).

It is advisable to perform the interaction of said components in the presence of trifurylborate at a ratio thereof to the epoxy diane resin (expressed in parts by weight) equal to 10–30:100 respectively. In this case there is obtained a furan-epoxy binder which imparts, to polymeric materials, based thereon, the property of inflammability or self-extinction.

The process according to the present invention is simple in both technology and equipment employed. It enables the preparation of the desired product at a high yield of up to 95%.

DETAILED DESCRIPTION OF THE INVENTION

Into a reactor provided with a heating means, a reflux condenser, thermometer and a stirrer there are charged specified amounts of an epoxy diane resin, a ketone of the furan series, a modifying agent and, when required, trifurylborate. The reaction mixture is heated to a temperature within the range of from 130° to 180° C. and the process is conducted for a period of from 1 to 3 hours. Then the resulting furanepoxy binder is poured from the reactor onto a griddle, cooled to a temperature of at most 30° C., for example, to room temperature and ground to a powder with a specified particle size (depending on the end use of the binder). It is undesirable to cool the binder to a temperature above 30° C., since in this case the binder, upon its disintegration, adheres to the parts of the disintegration means.

The mixture of monofurfurylideneacetone and difurfurylideneacetone as used in the process of the present invention may be prepared by condensation of furfural with acetone in the presence of a catalyst, viz. an alkali, at a temperature within the range of from 60° to 90° C. (cf. E. V. Orobchenko "Furan Resins", Kiev, 1963, pp. 64–70).

For a better understanding of the present invention some specific Examples of its particular embodiments are given hereinbelow. Properties of the furan-epoxy powder-like binder and those of polymers prepared therefrom are shown in Tables 1 and 2 respectively which are given after the Examples.

EXAMPLE 1

Into a reactor provided with a heating means, reflux condenser, thermometer and a stirrer there are charged 200 g of an epoxy diane resin (the product of polycondensation of epichlorohydrin with diphenylolpropane) with a number of epoxy groups of 14 to 16%, 80 g of difurfurylideneacetone, 20 g of trifurylborate and 120 g of maleic anhydride. The ratio between the components expressed in parts by weight is equal to 100:40:10:60 respectively. Temperature in the reactor is elevated to 130° C. and the process is conducted at this temperature for 2 hours. The resulting furan-epoxy binder (the yield is equal to 88%) is poured from the reactor, cooled to the temperature of 30° C. and disintegrated to powder with a predetermined particle size.

EXAMPLE 2

Into the reactor described in the foregoing Example 1 there are charged 200 g of an epoxy diane resin with a number of epoxy groups of 16–18%, 200 g of monofurfurylideneacetone, 24 g of trifurylborate and 200 g of phthalic anhydride. Ratio between said components, expressed in parts by weight, is equal to 100:100:12:100 respectively. The process is conducted at the temperature of 160° C. for 2 hours. The resulting product (the yield is equal to 88%) is poured from the reactor, cooled to the temperature of 25° C. and ground to a powder-like condition.

EXAMPLE 3

Into a reactor described in the foregoing Example 1 there are charged 200 g of an epoxy diane resin with a number of epoxy groups of 18–20%, 200 g of a mixture of monofurfurylideneacetone and difurfurylideneacetone at the ratio therebetween of 1:1 and 400 g of a resol phenol-formaldehyde resin (Ubbelohde drop point is 88°–90° C.). Ratio between said components, expressed in parts by weight, is equal to 100:100:200 respectively. The process is conducted at the temperature of 140° C. for 1 hour. The resulting product (the yield is equal to 95%) is poured from the reactor, cooled to the temperature of 20° C. and ground to a powder-like condition.

EXAMPLE 4

Into the reactor described in the foregoing Example 1 there are charged 200 g of an epoxy diane resin with a number of epoxy groups of 20–22%, 200 g of difurfurylideneacetone, 60 g of trifurylborate and 200 g of a novolac phenolformaldehyde resin (Ubbelohde drop point is 105°–115° C.). The ratio between said components, expressed in parts by weight is equal to 100:100:30:100 respectively. The process is conducted at the temperature of 140° C. for one hour. The resulting product (the yield is 95%) is poured from the reactor, cooled to the temperature of 20° C. and ground to a powder-like condition.

EXAMPLE 5

Into the reactor described in the foregoing Example 1 there are charged 200 g of an epoxy diane resin with a number of epoxy groups of 22–24%, 100 g of 1,9-di-(α-furyl)-nonanetetraene-1,3,6,8-one-5 and 460 g of a novolac phenolformaldehyde resin (Ubbelohde drop point is 115°–120° C.). The ratio between said components, expressed in parts by weight, is equal to 100:200:300 respectively. The process is conducted at the temperature of 150° C. for two hours. The resulting product (the yield is 94%) is discharged from the reactor, cooled to the temperature of 25° C. and ground to a powder-like condition.

EXAMPLE 6

Into the reactor described in Example 1 hereinbefore there are charged 100 g of an epoxy diane resin with a number of epoxy groups of 16–18%, 400 g of difurfurylidenecyclohexanone and 460 g of methyltetrahydrophthalic anhydride. The ratio between said components, expressed in parts by weight, is equal to 100:400:460 respectively. The process is conducted at the temperature of 180° C. for three hours. The resulting product (the yield is equal to 88%) is discharged from the reactor, cooled to the temperature of 20° C. and ground to a powder-like condition.

EXAMPLE 7

Into the reactor described in Example 1 hereinbefore there are charged 100 g of an epoxy diane resin with a number of epoxy groups of 20–22%, 100 g of 1,5-di-(α-furyl)-2,4-dimethylpentadiene-1,4-one-3 and 500 g of a novolac phenol-formaldehyde resin (Ubbelohde drop point is 120°–130° C.). The ratio between said components expressed in parts by weight is equal to 100:100:500 respectively. The process is conducted at the temperature of 180° C. for two hours. The resulting product (the yield is equal to 90%) is discharged from the reactor, cooled to the temperature of 25° C. and ground to a powder-like condition.

EXAMPLE 8

Into the reactor described in the foregoing Example 1 there are charged 200 g of an epoxy diane resin with a number of epoxy groups of 18–20%, 200 g of a mixture of monofurfurylideneacetone and difurfurylideneacetone at the ratio therebetween (expressed in parts by weight) of 1.4:1, 60 g of trifurylborate and 120 g of a novolac phenol-formaldehyde resin (Ubbelohde drop point is 95°–105° C.). The ratio between said components, expressed in parts by weight, is equal to 100:100:30:60 respectively. The process is conducted at the temperature of 130° C. for 1.5 hour. The resulting product (the yield is equal to 92%) is discharged from the reactor, cooled to the temperature of 20° C. and ground to a powder-like condition.

EXAMPLE 9

Into the reactor described in Example 1 hereinbefore there are charged 200 g of an epoxy diane resin with a number of epoxy groups of 14–16%, 200 g of a mixture of monofurfurylideneacetone and difurfurylideneacetone at the weight ratio therebetween of 1.2:1 (expressed in parts by weight) and 200 g of phthalic anhydride. The ratio between said components, expressed in parts by weight, is equal to 100:100:100 respectively. The process is conducted at the temperature of 180° C. for 1.5 hour. The resulting product (the yield is equal to 88%) is discharged from the reactor, cooled to the temperature of 30° C. and ground to a powder-like condition.

EXAMPLE 10

Into the reactor described in Example 1, there are charged 100 g of an epoxy diane resin with a number of epoxy groups of 18–20%, 400 g of difurfurylideneacetone, 30 g of trifurylborate and 400 g of a novolac phenol-formaldehyde resin (Ubbelohde drop point is 105°–115° C.). The ratio between said components, expressed in parts by weight, is equal to 100:400:30:400 respectively. The process is conducted at the temperature of 140° C. for two hours. The resulting product (the yield is equal to 95%) is discharged from the reactor, cooled to the temperature of 20° C. and ground to a powder-like condition.

EXAMPLE 11

Into the reactor described in Example 1 hereinbefore there are charged 100 g of an epoxy diane resin with a number of epoxy groups of 18-20%, 400 g of monofurfurylideneacetone, 30 g of trifurylborate and 400 g of a novolac phenolformaldehyde resin (Ubbelohde drop point is 115°-120° C.). The ratio between said components, expressed in parts by weight, is equal to 100:400:30:400 respectively. The process is conducted at the temperature of 140° C. for 1.5 hour. The resulting product (the yield is equal to 92%) is discharged from the reactor, cooled to the temperature of 25° C. and ground to a powder-like condition.

EXAMPLE 12

Into the reactor described in Example 1 there are charged 100 g of an epoxy diane resin with a number of epoxy groups of 20-22%, 200 g of monofurfurylideneacetone and 60 g of maleic anhydride. The ratio between said components, expressed in parts by weight, is equal to 100:200:60 respectively. The process is conducted at the temperature of 150° C. for two hours. The resulting product (the yield is equal to 90%) is discharged from the reactor, cooled to the temperature of 20° C. and ground to a powder-like condition.

EXAMPLE 13

Into the reactor described in Example 1 hereinbefore there are charged 200 g of an epoxy diane resin with a number of epoxy groups of 14-16%, 200 g of monofurfurylideneacetone, 30 g of trifurylborate and 120 g of methyltetrahydrophthalic anhydride. The ratio between said components, expressed in parts by weight, is equal to 100:100:15:60 respectively. The process is conducted at the temperature of 170° C. for two hours. The resulting product (the yield is equal to 88%) is discharged from the reactor, cooled to the temperature of 25° C. and ground to a powder-like condition.

EXAMPLE 14

Into the reactor described in the foregoing Example 1 there are charged 100 g of an epoxy diane resin with a number of epoxy groups of 18-20%, 400 g of 1,9-di-(α-furyl)-nonanetetraene-1,3,6,8-one-5, 30 g of trifurylborate and 200 g of a resol phenol-formaldehyde resin (Ubbelohde drop point is equal to 85°-88° C.). The ratio between said components, expressed in parts by weight, is equal to 100:400:30:200 respectively. The process is conducted at the temperature of 180° C. for two hours. The resulting product (the yield is equal to 88%) is poured from the reactor, cooled to the temperature of 30° C. and ground to a powder-like condition.

EXAMPLE 15

Into the reactor described in Example 1 there are charged 100 g of an epoxy diane resin with a number of epoxy groups of 20-22%, 500 g of 1,5-di-(α-furyl)-2,4-dimethylpentadiene-1,4-one-3, 30 g of trifurylborate and 500 g of phthalic anhydride. The ratio between said components, expressed in parts by weight, is equal to 100:500:30:500 respectively. The process is conducted at the temperature of 160° C. for two hours. The resulting product (the yield is equal to 88%) is discharged from the reactor, cooled to the temperature of 25° C. and ground to a powder-like condition.

EXAMPLE 16

Into the reactor described in Example 1 hereinbefore there are charged 200 g of an epoxy diane resin with a number of epoxy groups of 18-20%, 80 g of difurfurylidenecyclohexanone, 20 g of trifurylborate and 400 g of a novolac phenol-formaldehyde resin (Ubbelohde drop point is 95°-105° C.). The ratio between said components, expressed in parts by weight, is equal to 100:40:10:200 respectively. The process is conducted at the temperature of 160° C. for three hours. The resulting product (the yield is equal to 95%) is discharged from the reactor, cooled to the temperature of 20° C. and ground to a powder-like condition.

EXAMPLE 17

Into the reactor described in the foregoing Example 1 there are charged 200 g of an epoxy diane resin with a number of epoxy groups of 22-24%, 80 g of monofurfurylideneacetone, 20 g of trifurylborate and 120 g of phthalic anhydride. The ratio between said components, expressed in parts by weight, is equal to 100:40:10:60 respectively. The process is conducted at the temperature of 170° C. for two hours. The resulting product (the yield is equal to 88%) is discharged from the reactor, cooled to the temperature of 15° C. and disintegrated to a powder-like condition.

EXAMPLE 18

Into the reactor described in Example 1 hereinbefore there are charged 100 g of an epoxy diane resin with a number of epoxy groups of 18-20%, 500 g of a mixture of monofurfurylideneacetone and difurfurylideneacetone at the ratio therebetween (expressed in parts by weight) of 1.4:1, 30 g of trifurylborate and 500 g of maleic anhydride. The ratio between said components, expressed in parts by weight, is equal to 100:500:30:500 respectively. The process is conducted at the temperature of 160° C. for two hours. The resulting product (the yield is equal to 90%) is discharged from the reactor, cooled to the temperature of 20° C. and disintegrated to a powder-like condition.

EXAMPLE 19

Into the reactor of Example 1 there are charged 80 g of an epoxy diane resin with a number of epoxy groups of 22-24%, 400 g of difurfurylideneacetone and 400 g of a resol phenol-formaldehyde resin (Ubbelohde drop point is 78°-80° C.). The ratio between said components is equal to 100:500:500 respectively (in parts by weight). The process is conducted at the temperature of 150° C. for 1.5 hour. The resulting product (the yield is equal to 92%) is discharged from the reactor, cooled to the temperature of 25° C. and disintegrated to a powder-like condition.

EXAMPLE 20

Into the reactor described in Example 1 hereinbefore there are charged 200 g of an epoxy diane resin with a number of epoxy groups of 16-18%, 80 g of difurfurylideneacetone, 30 g of trifurylborate and 120 g of a resol phenolformaldehyde resin (Ubbelohde drop point is 88°-90° C.). The ratio between the components, expressed in parts by weight is equal to 100:40:15:60 respectively. The process is conducted at the temperature of 160° C. for one hour. The resulting product (the yield is equal to 90%) is discharged from the reactor, cooled to the temperature of 20° C. and disintegrated to a powder-like condition.

EXAMPLE 21

Into the reactor described in Example 1 there are charged 100 g of an epoxy diane resin with a number of epoxy groups of 18–20%, 250 g of difurfurylideneacetone, 30 g of trifurylborate and 250 g of a resol phenol-formaldehyde resin (Ubbelohde drop point is 85°–88° C.). The ratio between said components, expressed in parts by weight, is equal to 100:250:30:250 respectively. The process is conducted at the temperature of 130° C. for 2.5 hours. The resulting product (the yield is equal to 95%) is discharged from the reactor, cooled to the temperature of 15° C. and disintegrated to a powder-like condition.

Properties of the furan-epoxy powder-like binder produced by the process of the present invention in Examples 1 through 21 and by the prior art process are given in the following Table 1.

Table 1

| Furan-epoxy powder-like binder produced by the process of the present invention, as of | Properties | | | | | | |
|---|---|---|---|---|---|---|---|
| | Appearance | Melting point, °C. | Ubbelohde drop point, °C. | Solubility in acetone | Content of epoxy groups, % | Stability upon storage, months | Non-clogging ability, days |
| 1 | 2 | 3 | 4 | 5 | 6 | 7 | 8 |
| Example 1 | Powder of yellow to dark brown colour | 82 | 109 | Total | 2.8 | 6 | 35 |
| Example 2 | | 102 | 123 | " | 2.0 | 10 | 50 |
| Example 3 | | 85 | 112 | " | 3.2 | 9 | 45 |
| Example 4 | | 80 | 103 | " | 4.2 | 12 | 60 |
| Example 5 | | 103 | 127 | Total | 2.6 | 8 | 40 |
| Example 6 | | 95 | 118 | " | 2.1 | 10 | 50 |
| Example 7 | | 105 | 130 | " | 2.0 | 12 | 60 |
| Example 8 | Powder of yellow to dark brown colour | 81 | 97 | " | 4.6 | 7 | 40 |
| Example 9 | | 102 | 127 | " | 2.3 | 11 | 45 |
| Example 10 | | 88 | 109 | " | 2.4 | 9 | 45 |
| Example 11 | | 84 | 103 | " | 2.9 | 8 | 40 |
| Example 12 | | 81 | 101 | " | 4.1 | 7 | 35 |
| Example 13 | | 92 | 115 | " | 2.7 | 12 | 60 |
| Example 14 | | 106 | 131 | " | 2.1 | 12 | 60 |
| Example 15 | | 87 | 108 | " | 2.1 | 9 | 40 |
| Example 16 | | 90 | 114 | " | 2.9 | 12 | 60 |
| Example 17 | | 94 | 116 | " | 4.0 | 8 | 35 |
| Example 18 | | 106 | 131 | Total | 2.2 | 12 | 60 |
| Example 19 | | 98 | 127 | " | 1.8 | 8 | 60 |
| Example 20 | | 83 | 109 | " | 3.9 | 7 | 60 |
| Example 21 | | 100 | 129 | " | 4.2 | 7 | 60 |
| Binder produced by the prior art process | dark-brown powder | 92 | 114 | " | — | 3 | 30 |

Properties of a polymer produced from the furan-epoxy powder-like binder according to the present invention are shown in the following Table 2. The polymer is prepared by curing of the binder according to a step-wise schedule at a temperature within the range of from 140° to 200° C. with the interval of 6 hours after every 20° C.

Table 2

| Properties | Value |
| --- | --- |
| Vicat strain heat-resistance, °C. | 215–320 |
| Ultimate compression strength, kgf/cm$^2$ | 800–1,400 |
| Ultimate strength at static bending, kgf/cm$^2$ | 350–600 |
| Resilience, kgf.cm/cm$^2$ | 2–8 |
| Brinnel hardness, kgf/cm$^2$ | 3,000–4,500 |
| Coke number, % | 35–60 |
| Dielectric loss angle at 50 Hz and 20° C. | $25.10^{-3}$–$30.10^{-3}$ |
| Chemical resistance: | |
| against alkalis | Resistant |
| against acids | Resistant |
| Inflammability: | |
| of the polymer produced from the binder of Examples 3, 5, 6, 7, 9, 12, 19 | Inflammable |
| of the polymer produced from the binder of Examples 1, 2, 16, 17 | Capable of self-extinguishing |
| of the polymer produced from the binder of Examples 4, 8, 10, 11, 13, 14, 15, 18, 20, 21 | Non-inflammable |

What is claimed is:

1. A process for producing a furan-epoxy powder-like binder comprising reacting (A) 100 parts by weight of an epoxy diane resin with (B) 40–500 parts by weight of a ketone of the furan series selected from the group consisting of monofurfurylideneacetone, difurfurylideneacetone, difurfurylidenecyclohexanone, a mixture of monofurfurylideneacetone and difurfurylideneacetone at a ratio therebetween, expressed in parts by weight, of from 1:1 to 1.4:1, 1,9-di-(α-furyl)nonanetetraene-1,3,6,8-one-5 or 1,5-di-(α-furyl)-2,4,-dimethylpentadiene-1,4-one-3; and (C) 60–500 parts by weight of phenol-formaldehyde resin as a modifying agent; at a temperature within the range of from 130° to 180° C; and cooling the resulting product to a temperature of at most 30° C.; and disintegrating the cooled product to a powder-like condition.

2. A process for producing a furan-epoxy powder-like binder comprising reaction (A) 100 parts by weight of an epoxy diane resin with (B) 40–500 parts by weight of a ketone of the furan series selected from the group consisting of monofurfurylideneacetone, difurfurylideneacetone, difurfurylidenecyclohexanone, a mixture of monofurfurylideneacetone and difurfurylideneacetone at a ratio therebetween, expressed in parts by weight, of from 1:1 to 1.4:1; 1,9-di-(α-furyl)-nonanetetraene-1,3,6,8-one-5 or 1,5-di-(αfuryl)-2,4-dimethylpentadiene-1,4-one-3; and (C) 60–500 parts by weight of a modifying agent selected from the group consisting of phenol-formaldehyde resin and anhydrides of dibasic carboxylic acids; at a temperature within the range of from 130° to 180° C. and in the presence of 10–30 parts by weight of trifurylborate; cooling the resulting product to a temperature of at most 30° C.; and disintegrating the cooled product to a powder-like condition.